(12) United States Patent
Rogan

(10) Patent No.: US 9,110,163 B2
(45) Date of Patent: Aug. 18, 2015

(54) LIDAR-BASED CLASSIFICATION OF OBJECT MOVEMENT

(71) Applicant: Microsoft Corporation, Redmond, WA (US)

(72) Inventor: Aaron Matthew Rogan, Westminster, CO (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/917,821

(22) Filed: Jun. 14, 2013

(65) Prior Publication Data

US 2014/0368807 A1    Dec. 18, 2014

(51) Int. Cl.
*G01C 3/08* (2006.01)
*G01S 17/50* (2006.01)

(52) U.S. Cl.
CPC ....................................... *G01S 17/50* (2013.01)
USPC ....... 356/5.01; 356/5.09; 356/4.01; 356/4.07; 356/9; 356/625; 356/3.01

(58) Field of Classification Search
CPC ......... G01S 17/10; G01S 7/497; G01S 17/89; G01S 7/487; G01C 3/08
USPC .................. 356/5.01, 4.01, 4.07, 9, 625, 3.01
See application file for complete search history.

(56) References Cited

U.S. PATENT DOCUMENTS

| | | | |
|---|---|---|---|
| 8,244,026 | B2 | 8/2012 | Nahari |
| 8,269,652 | B2 | 9/2012 | Seder et al. |
| 8,332,134 | B2 | 12/2012 | Zhang et al. |
| 2005/0075811 | A1 * | 4/2005 | Lafitte et al. ..................... 702/70 |
| 2008/0018646 | A1 * | 1/2008 | Farag et al. .................... 345/424 |
| 2009/0175527 | A1 * | 7/2009 | Agliozzo et al. ............... 382/132 |
| 2010/0053593 | A1 | 3/2010 | Bedros |
| 2010/0188504 | A1 * | 7/2010 | Dimsdale et al. ............. 348/142 |
| 2010/0204964 | A1 | 8/2010 | Pack |
| 2011/0224844 | A1 * | 9/2011 | Farwell et al. .................... 701/2 |

(Continued)

OTHER PUBLICATIONS

"Tracking People with a 360-Degree Lidar", John Shackleton, Brian Vanvoorst and Joel Hesch, Aug. 29, 2008, Proceedings: In Proceedings of the 7th IEEE International Conference on Advanced Video and Signal Based Surveillance, 7 pgs.

(Continued)

*Primary Examiner* — Isam Alsomiri
*Assistant Examiner* — Samantha K Abraham
(74) *Attorney, Agent, or Firm* — Steven Spellman; Danielle Johnston-Holmes; Micky Minhas

(57) ABSTRACT

Within machine vision, object movement is often estimated by applying image evaluation techniques to visible light images, utilizing techniques such as perspective and parallax. However, the precision of such techniques may be limited due to visual distortions in the images, such as glare and shadows. Instead, lidar data may be available (e.g., for object avoidance in automated navigation), and may serve as a high-precision data source for such determinations. Respective lidar points of a lidar point cloud may be mapped to voxels of a three-dimensional voxel space, and voxel clusters may be identified as objects. The movement of the lidar points may be classified over time, and the respective objects may be classified as moving or stationary based on the classification of the lidar points associated with the object. This classification may yield precise results, because voxels in three-dimensional voxel space present clearly differentiable statuses when evaluated over time.

20 Claims, 8 Drawing Sheets

(56) References Cited

U.S. PATENT DOCUMENTS

| | | | |
|---|---|---|---|
| 2012/0186774 A1* | 7/2012 | Matsuoka et al. | 165/11.1 |
| 2012/0294532 A1 | 11/2012 | Morris | |
| 2013/0051655 A1* | 2/2013 | Collard et al. | 382/154 |
| 2013/0170557 A1* | 7/2013 | Wang et al. | 375/240.24 |
| 2013/0265189 A1* | 10/2013 | Chang et al. | 342/52 |

OTHER PUBLICATIONS

"A Lidar and Vision-based Approach for Pedestrian and Vehicle Detection and Tracking", Cristiano Premebida, Goncalo Monteiro, Urbano Nunes and Paulo Peixoto, Sep. 30, 2007, Preoceedings: In IEEE Intelligent Transportation Systems Conference, 7 pgs.

"Automatic Classification of LIDAR Data into Ground and Nonground Points", Yu-Chuan Chang, Ayman F. Habib, Dong Cheon Lee and Jae-Hong Yom, Jul. 3, 2008, Proceedings: In the International Archives of the Photogrammetry, Remove Sensing and Spatial Information Sciences, 6 pgs.

"Analysis of LIDAR Data Fused with Co-Registered Bands", Marc Bartels, Hong Wei and James Ferryman, Nov. 22, 2006, Proceedings: In Proceedings of the IEEE International Conference on Video and Signal Based Surveillance, 6 pgs.

"A Method for Detecting Windows from Mobile LIDAR Data", Ruisheng Wang, Frand P. Ferrie and Jane MacFarlane, Jan. 5, 2011, Proceedings: In Proceedings of the IEEE Workshop on Applications of Computer Vision, 31 pgs.

Frome, et al., "Large-Scale Privacy Protection in Google Street View"—Published Date: Nov. 29, 2009 Proceedings: In IEEE 12th International Conference on Computer Vision, pp. 8 http://static.googleusercontent.com/external_content/untrusted_dlcp/research.google.com/en//archive/papers/cbprivacy_iccv09.pdf.

Devaux, et al., "Increasing Interactivity in Street View Web Navigation Systems"—Published Date: Oct. 25, 2010 Proceedings: In Proceedings of the International Conference on Multimedia, pp. 4 http://www.itowns.fr/publications/ACM2010Devaux.pdf.

Bartels, et al., "Rule-based Improvement of Maximum Likelihood Classified LIDAR Data fused with Co-Registered Bands"—Published Date: Sep. 5, 2009, Proceedings: In Annual Conference of the Remote Sensing and Photogrammetry Society, pp. 9, http://citeseerx.ist.psu.edu/viewdoc/download?doi=10.1.1.66.3166&rep=rep1&type=pdf.

Kim, et al., "Dense Structure Inference for Object Classification in Aerial LIDAR Dataset"—Published Date: Aug. 23, 2010 Proceedings: In International Conference on Pattern Recognition, pp. 4, http://iris.usc.edu/outlines/papers/2010/kim-medioni-icpr10.pdf.

Klucker, et al., "Semantic Classification in Aerial Imagery by Integrating Appearance and Height Information"—Published Date: Sep. 23, 2009, Proceedings: In Proceedings of the 9th Asian conference on Computer Vision—vol. Part II, pp. 477-488, pp. 12, http://citeseerx.ist.psu.edu/viewdoc/download?doi=10.1.1.150.1134&rep=rep1&type=pdf.

Frome, et al., "Large-Scale Privacy Protection in Google Street View" —Published Date: Nov. 29, 2009 Proceedings: in IEEE 12th International Conference on Computer Vision, pp. 8 http://static.googleusercontent.com/external_content/untrusted_dlcp/research.google.com/en//archive/papers/cbprivacy_iccv09.pdf.

Devaux, et al., "Increasing Interactivity in Street View Web Navigation Systems" —Published Date: Oct. 25, 2010 Proceedings: In Proceedings of the International Conference on Multimedia, pp. 4 http://www.itowns.fr/publications/ACM2010Devaux.pdf.

Bartels, et al., "Rule-based Improvement of Maximum Likelihood Classified LIDAR Data fused with Co-Registered Bands" —Published Date: Sep. 5, 2006, Proceedings: In Annual Conference of the Remote Sensing and Photogrammetry Society, pp. 9, http://citeseerx.ist.psu.edu/viewdoc/download? doi=10.1.1.66.3166&rep=rep1&type=pdf.

Kim, et al., "Dense Structure Inference for Object Classification in Aerial LIDAR Dataset" —Published Date: Aug. 23, 2010 Proceedings: In International Conference on Pattern Recognition, pp. 4, http://iris.usc.edu/outlines/papers/2010/kim-medioni-icpr10.pdf.

Klucker, et al., "Semantic Classification in Aerial Imagery by Integrating Appearance and Height Information" —Published Date: Sep. 23, 2009, Proceedings: In Proceedings of the 9th Asian conference on Computer Vision-vol. Part II, pp. 477-488, pp. 12, http://citeseerx.ist.psu.edu/viewdoc/download? doi=10.1.1.150.1134&rep=rep1&type=pdf.

"International Search Report & Written Opinion for PCT Patent Application No. PCT/US2014/041827", Mailed Date: Sep. 15, 2014, 11 Pages.

Himmelsbach, et al., "Real-Time Object Classification In 3d Point Clouds Using Point Feature Histograms", in IEEE/ RSJ International Conference on Intelligent Robots and Systems, Oct. 10, 2009, 7 Pages.

Jozsa, et al., "Towards 4D Virtual City Reconstruction From Lidar Point Cloud Sequences", in ISPRS Annals of Photogrammetry, Remote Sensing and Spatial Information Sciences, vol. II-31W1, May 28, 2013, pp. 15-20.

Xu, et al., "Survey Of Clustering Algorithms", In IEEE Transactions on Neural Networks, vol. 16, Issue 3, May 1, 2005, 34 Pages.

\* cited by examiner

LIDAR-BASED CLASSIFICATION OF OBJECT MOVEMENT

BACKGROUND

Within the field of machine vision, many scenarios involve the detection of movement of various objects, such as object motion tracking and speed estimation techniques and devices. For example, a sequence of images of a scene captured over a brief period of time may be evaluated to identify a particular object that is visible in several sequential images, and based on various geometric properties of the scene, the movement of the object through the scene over the captured time period may be estimated. Some such scenarios may involve a real-time or near-realtime evaluation of such objects, while other scenarios may involve a retrospective evaluation of previously captured images; e.g., a vehicle moving down a street may capture a sequence of images of the scene to be stitched together to form a panoramic or dynamic view of the scene, and the images may later be post-processed to remove obstructions of the view by transient objects present during the capturing.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

While objects may be identified, estimated as moving or stationary, and removed from a sequence of natural-light images, the precision of such estimation that is achievable through only analysis of visual image may be limited. However, the analysis may be supplemented with ranging information about such objects gathered by lidar, which is often included in vehicles for object detection, avoidance, and navigation. The availability and use of lidar may provide a high-precision source of data that may be particularly revealing in an evaluation of whether such objects are moving or stationary, as each type of object may present a distinctly different signature of lidar data.

In view of these observations, presented herein are techniques for detecting movement of objects depicted in a lidar point cloud. These techniques involve mapping respective lidar points in the lidar point cloud to a voxel in a three-dimensional voxel space, and identifying at least one object represented by a voxel cluster of voxels sharing an adjacency within the three-dimensional voxel space. These techniques also involve, for the respective lidar points in the lidar point cloud, associating the lidar point with a selected object, and classifying the movement of the lidar point according to the selected object. Finally, these techniques involve, for the respective objects, classifying the movement of the object according to the movement of the respective lidar points associated with the object. By achieving the detection of movement of respective objects depicted in the lidar point cloud in this manner, the techniques presented herein may enable a high-precision classification of moving vs. stationary objects in the visual space, where such classification may be usable for a variety of further processing techniques (e.g., focusing one or more images on the object; estimating a position, orientation, velocity, and/or acceleration of the object; and removing the object from images depicting the area represented by the lidar point cloud) in accordance with the techniques presented herein.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
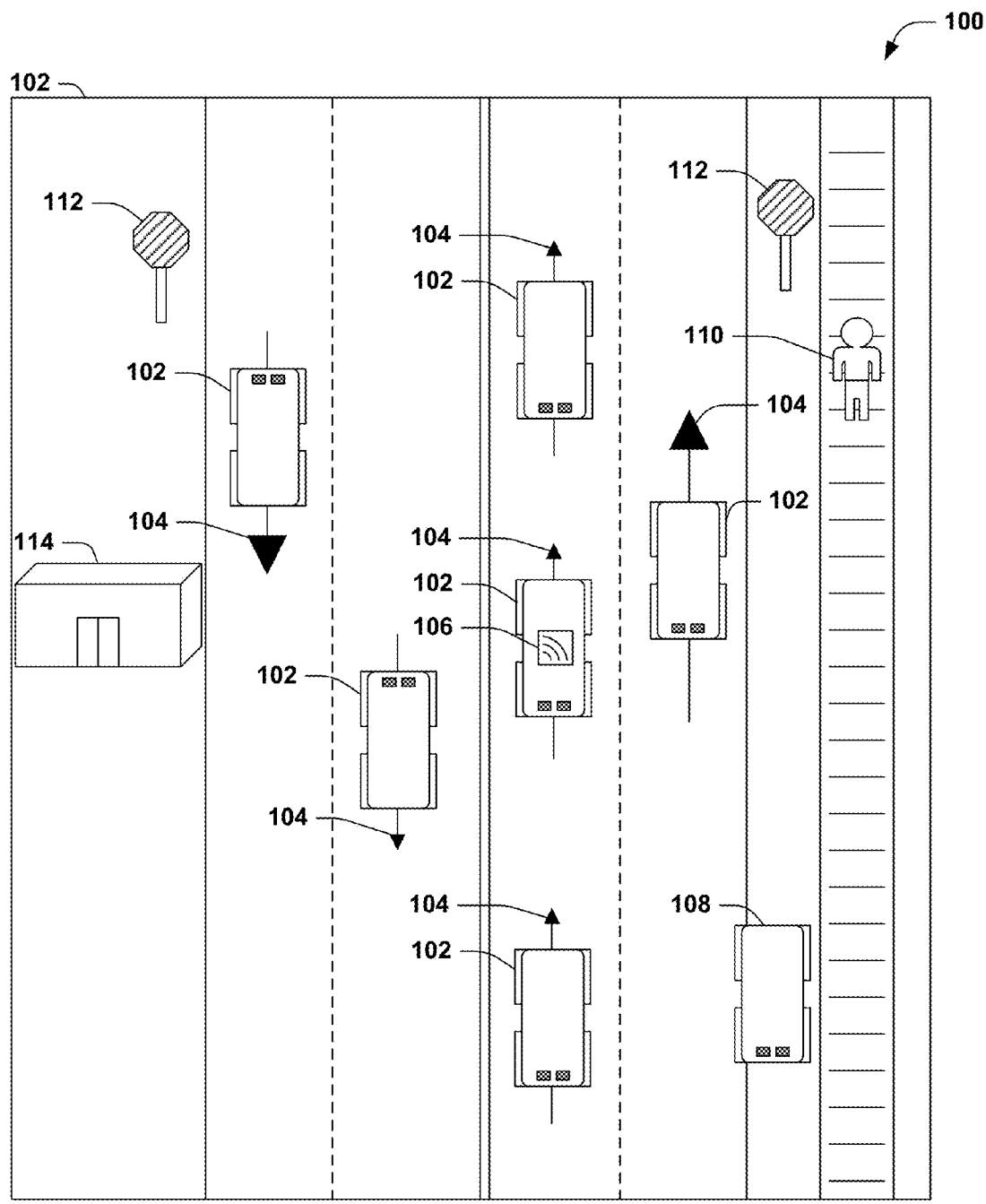
FIG. 1 is an illustration of an exemplary scenario featuring a vehicle moving within an environment while capturing images of the environment and other objects present in the environment.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

A. Introduction

Within the field of machine vision, many scenarios involve an automated evaluation of images of an environment to detect the objects present in the environment and depicted in the images, and, more particularly, to identify the position, size, orientation, velocity, and/or acceleration of the objects. As a first example, the evaluation may involve vehicles in a transit environment, including automobiles, bicycles, and pedestrians in a roadway as well as signs, trees, and buildings, in order to facilitate obstacle avoidance. As a second example, a physical object tracking system may evaluate the motion of an object within an environment in order to interact with it (e.g., to catch a ball or other thrown object). As a third example, a human actor present in a motion-capture environment may be recorded while performing various actions in order to render animated personalities with human-like movement. In various scenarios, the analysis may be performed in realtime or near-realtime (e.g., to facilitate a device or individual in interacting with the other present objects), while in other scenarios, the analysis may be performed retrospectively (e.g., to identify the movement of objects that were present at the time of the capturing). These and other scenarios often involve the capturing and evaluation of a set of visible light images, e.g., with a still or motion camera, and the application of visual processing techniques to human-viewable images. For example, machine vision techniques may attempt to evaluate, from the contents of the image, the type, color, size, shape, orientation, position, speed, and acceleration of an object based on visual cues such as shadowing from light sources, perspective, relative sizes, and parallax effects.

FIG. 1 presents an illustration of an exemplary scenario featuring a vehicle 102 operating in an environment 100 (e.g., with a particular velocity vector 104 while operating a camera 106 to capture a sequence of images of the environment 100. In this exemplary scenario, other vehicles 102 are also present in the environment 100, and may involve both vehicles 102 having a velocity vector 104 and stationary vehicles 108, such as parked cars. The environment 100 may also include other types of moving objects, such as individuals 110, as well as various stationary objects, such as signs 112 and buildings 114. In this environment, an operator of the vehicle 102 may endeavor to identify the velocity vectors 104 of respective vehicles 102, as well as of individuals 110, and to distinguish between moving vehicles 102 and stationary vehicles 108, as well as other types of objects that are moving or stationary. The results of this analysis, if performed in near-realtime, may assist in the navigation of the vehicle 102 (such as matching speed with other nearby vehicles 102 and applying brakes and steering to avoid sudden velocity changes). Additionally, the results of this analysis may be retrospectively useful, e.g., for removing the depicted vehicles 102 and other objects from the images captured by the camera 106 in order to generate an unobstructed view of the environment 100 and/or to generate a more accurate three-dimensional model of the moving objects for various applications, including sharpened visualization, further classification of the object (e.g., identifying the make and model of a moving vehicle), and movement tracking.

However, in these scenarios, the achievable precision in the identification of the movement of the objects from an inspection of visual images may be limited. For example, techniques such as perspective and parallax may provide only general estimates, particularly for objects that are distant from the camera lens, and/or may be distorted by visual artifacts, such as glare and shadows. As a result, such evaluative techniques may produce estimates with low precision and/or a high degree of error, and may be inadequate for particular uses.

B. Presented Techniques

Many scenarios involving the evaluation of object movement may be achieved through devices (such as vehicles 102) that also have access to data from a laser imaging ("lidar") capturing device, which may emit a set of focused, low-power beams of light of a specified wavelength, and may detect and record the reflection of such wavelengths of light from various objects. The detected lidar data may be used to generate a lidar point cloud, representing the lidar points of light reflected from the object and returning to the detector, thus indicating specific points of the objects present in the environment 100. By capturing and evaluating lidar data over time, such a device may build up a representation of the relative positions of objects around the lidar detector (e.g., the locations of other vehicles 102 with respect to the vehicle 102 operating the camera 106).

Figure 2:
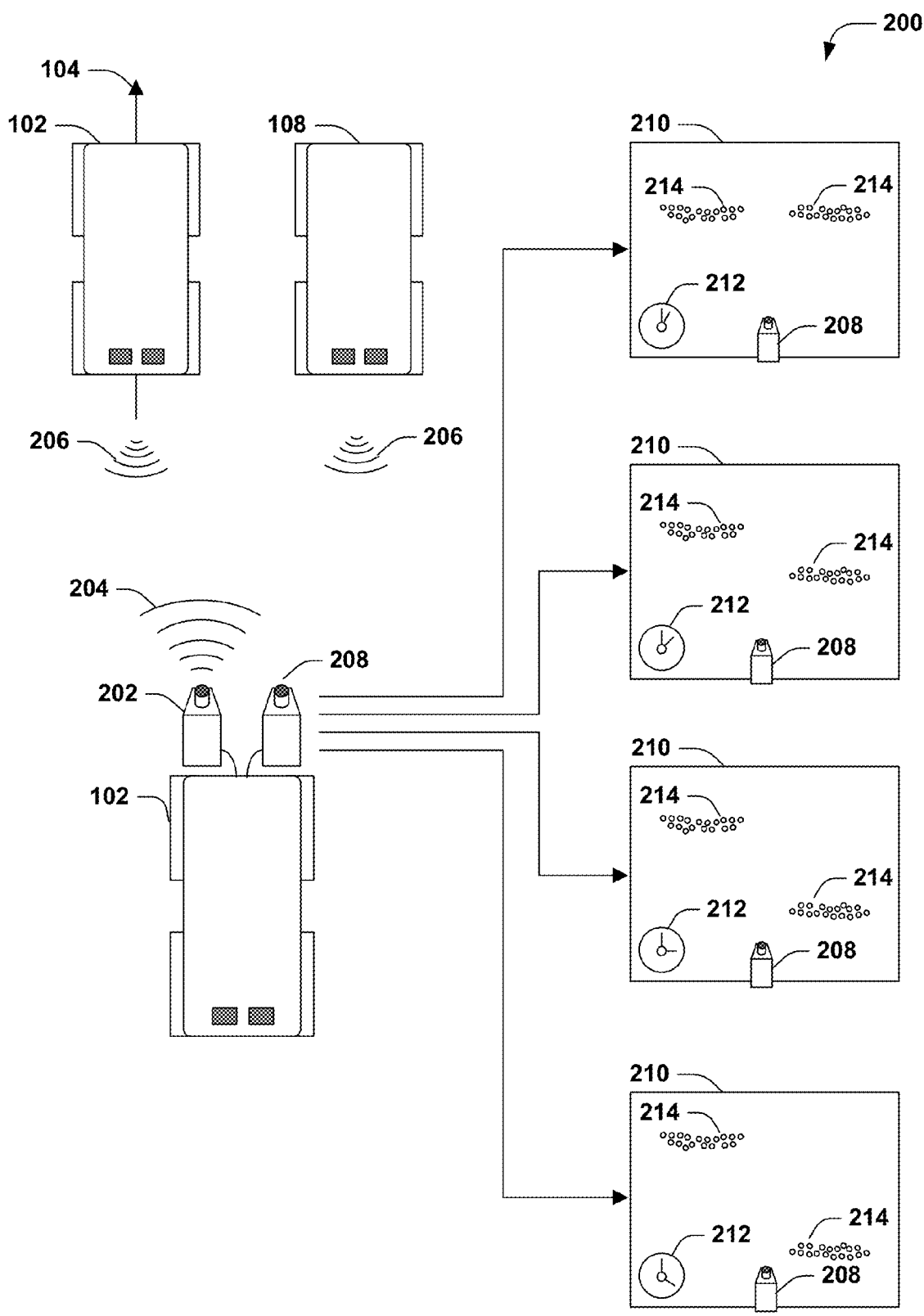
FIG. 2 is an illustration of an exemplary scenario featuring a capturing of a lidar point cloud of an environment around a vehicle and depicting the other objects present within the environment.

FIG. 2 presents an illustration of an exemplary scenario 200 featuring a capturing of objects (e.g., vehicles 102) using a lidar point cloud. In this exemplary scenario 200, a first vehicle 102 is positioned behind a moving vehicle 102 having a velocity vector 104, and a stationary vehicle 108 having no detectable motion. The first vehicle 102 may comprise a lidar emitter 202 that emits a lidar signal 204 ahead of the first vehicle 102. The lidar reflection 206 of the lidar signal 204 may be detected by a lidar detector 208, and captured as a sequence of lidar point clouds 210 representing, at respective time points 212, the lidar points 214 detected by the lidar detector 208 within the environment 100. In particular, the detected lidar points 214 may cluster around particular objects (such as vehicles 102), which may enable the lidar detector 208 to identify the presence, size, and/or range of the objects at respective time points 212. Additionally, by comparing the ranges of the vehicles 102 or other objects over time, the lidar detector 208 may determine an approximate velocity of the objects. For example, when comparing the lidar point clouds 210 over time, the lidar points 214 representing the moving vehicle 102 and the lidar points 214 representing the stationary vehicle 108 may move with respect to each other and the first vehicle 102. However, if the vehicle 102 carrying the lidar detector 208 is also moving, the approximate velocities of the vehicles 102 or other objects represented by the lidar points 214 in the lidar point cloud 210 may be distorted; e.g., stationary vehicles 108 may appear to be moving, while moving vehicles 102 that are moving at an approximately equivalent velocity and direction as the vehicle 102 carrying the lidar detector 208 may appear as stationary vehicles 108. Such complications may be come exacerbated if the objects are detected as moving in three-dimensional space as well as over time, and/or if the orientation of the vehicle 102 carrying the lidar detector 208 also changes (e.g., accelerating, decelerating, and/or turning). Even determining whether respective objects (such as vehicles 102) are moving or stationary may become difficult in view of these factors.

Figure 3:
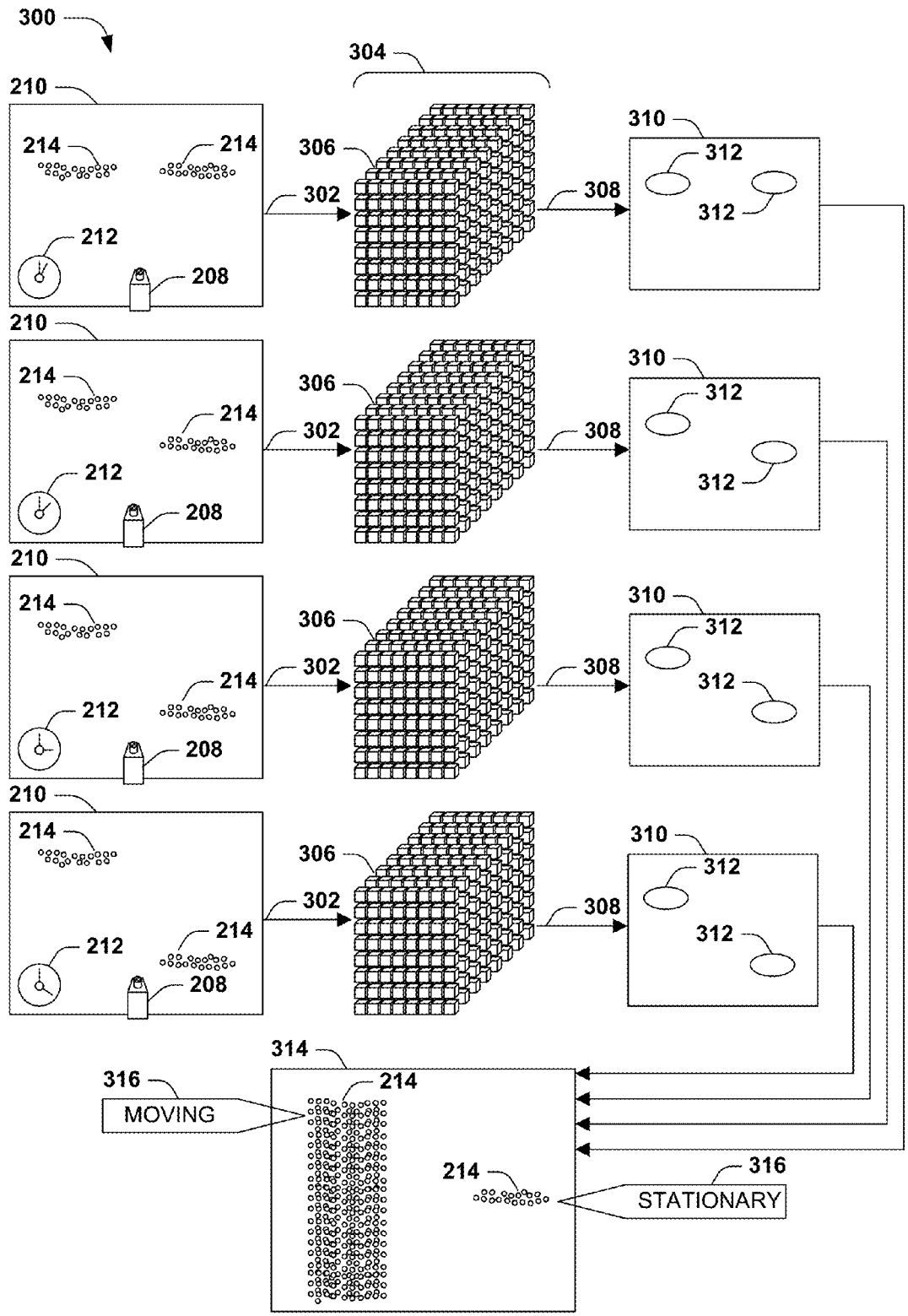
FIG. 3 is an illustration of an exemplary scenario featuring an evaluation of a lidar point cloud over time to classify identified objects as stationary or moving in accordance with the techniques presented herein.

In order to classify respective objects (such as vehicles 102) as moving or stationary, and optionally in order to identify other properties such as position and velocity, techniques may be utilized to translate the lidar points 214 of the respective lidar point clouds 210 to three-dimensional space. FIG. 3 presents an illustration of an exemplary scenario 300 featuring a translation of a set of lidar point clouds 210 to classify the objects depicted therein. In this exemplary scenario 300, for respective lidar point clouds 210, the lidar points 214 are mapped 302 to a voxel 306 in a three-dimensional voxel space 304. Next, the voxels 306 of the three-dimensional voxel space 304 may be evaluated to detect one or more voxel clusters of voxels 306 (e.g., voxels 306 that are occupied by one or more lidar points 214 in the lidar point cloud 210, and that share an adjacency with other occupied voxels 306 of the three-dimensional voxel space 304, such as within a specified number of voxels 306 of another occupied voxel 306), resulting in the identification 308 of one or more objects 312 within an object space 310 corresponding to the three-dimensional voxel space 304. Next, for the respective lidar points 214 in the lidar point cloud 210, the lidar point 214 may be associated with a selected object 312. The movement of the lidar points 214 may then be classified according to the selected object 312 (e.g., the objects may be identified as moving or stationary with the object 312 in the three-dimensional voxel space 304). According to the classified movements of the lidar points 214 associated with the object 312 (e.g., added for the object spaces 310 at respective time points 212), a projection 314 of the lidar points 214 and an evaluation of the movements of the lidar points 214 associated with respective objects 312, the movement of the respective objects 312 may be classified. For example, and as depicted in the projection 314 of FIG. 3, the lidar points 214 associated with the first object 312, after projection in view of the three-dimensional voxel space 304, appear to be moving with respect to the lidar detector 208, and may result in a classification 316 of the object 312 as a moving object; while the lidar points 214 associated with the second object 312, after projection in view of the three-dimensional voxel space 304, appear to be stationary after adjusting for the movement of the lidar detector 208, and may result in a classification 316 of the object 312 as a stationary object. In this manner, the techniques illustrated in the exemplary scenario 300 of FIG. 3 enable the classification 316 of the objects 312 identified within the environment 100 depicted by the lidar point clouds 210 into stationary objects and moving objects in accordance with the techniques presented herein.

C. Exemplary Embodiments

Figure 4:
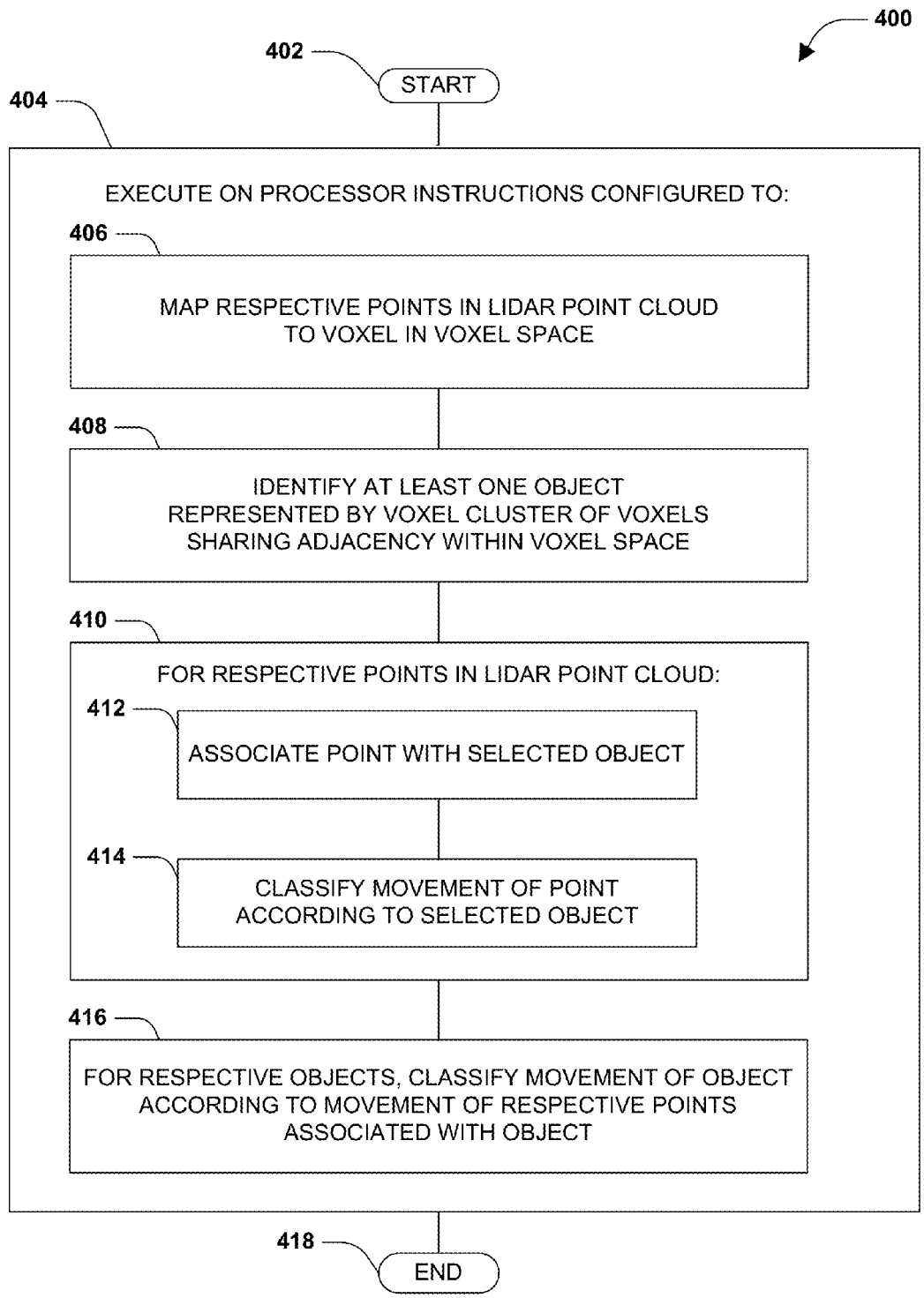
FIG. 4 is a flow diagram of an exemplary method of evaluating a lidar point cloud over time to classify identified objects as stationary or moving in accordance with the techniques presented herein.

FIG. 4 presents a first exemplary embodiment of the techniques presented herein, illustrated as an exemplary method 400 of detecting movement of objects 312 depicted in a lidar point cloud 210. The exemplary method 400 may be implemented, e.g., as a set of instructions stored in a memory device of the device, such as a memory circuit, a platter of a hard disk drive, a solid-state storage device, or a magnetic or optical disc, and organized such that, when executed on a processor of the device, cause the device to operate according to the techniques presented herein. The exemplary method 400 begins at 402 and involves executing 404 the instructions on a processor of the device. Specifically, these instructions may be configured to map 406 respective lidar points 214. Having achieved the identification and movement classification of the objects 312 presented in the environment 100 from the lidar point clouds 210 at respective time points 212, the exemplary method 400 applies the techniques presented herein to the classification of the movement of the objects 312, and so ends at 418.

Figure 5:
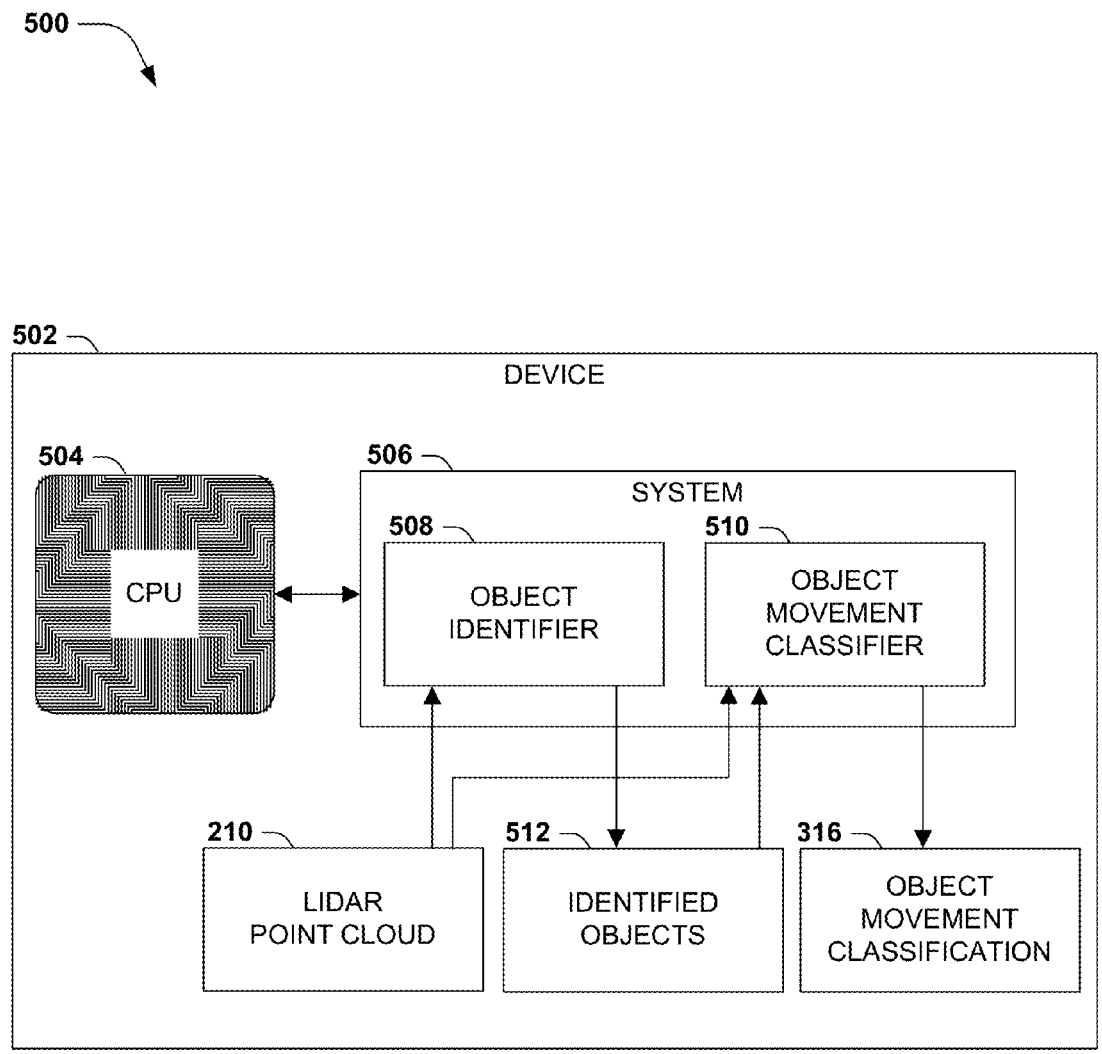
FIG. 5 is a component block diagram of an exemplary system configured to evaluate a lidar point cloud over time to classify identified objects as stationary or moving in accordance with the techniques presented herein.

FIG. 5 presents a second exemplary embodiment of the techniques presented herein, illustrated as an exemplary system 506 configured to classify the movement of objects 312 depicted in a lidar point cloud 210 of an environment 100. The exemplary system 506 may be implemented, e.g., as instructions stored in a memory component of the device 502 and configured to, when executed on the processor 504 of the device 502, cause the device 502 to operate according to the techniques presented herein. The exemplary system 506 includes an object identifier 508 that is configured to map 302 respective lidar points 214 in the lidar point cloud 210 to a voxel 306 in a three-dimensional voxel space 304, and identify 308 at least one object 312 represented by a voxel cluster of voxels 306 sharing an adjacency within the three-dimensional voxel space 304. The exemplary system 506 also comprises an object movement classifier 510, which is configured to, for the respective lidar points 214 in the lidar point cloud 210, associate the lidar point 214 with a selected object 312, classify the movement of the lidar point 214 according to the selected object 312; and, for the respective objects 312, classify the movement of the object 312 according to the movement of the respective lidar points 214 associated with the object 312. The interoperation of these components of the exemplary system 506 may enable the device 502 to achieve the classification 316 of the objects 312 represented by the lidar points 214 in the lidar point clouds 210 in accordance with the techniques presented herein.

Still another embodiment involves a computer-readable medium comprising processor-executable instructions configured to apply the techniques presented herein. Such computer-readable media may include, e.g., computer-readable storage media involving a tangible device, such as a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD-R, DVD-R, or floppy disc), encoding a set of computer-readable instructions that, when executed by a processor of a device, cause the device to implement the techniques presented herein. Such computer-readable media may also include (as a class of technologies that are distinct from computer-readable storage media) various types of communications media, such as a signal that may be propagated through various physical phenomena (e.g., an electromagnetic signal, a sound wave signal, or an optical signal) and in various wired scenarios (e.g., via an Ethernet or fiber optic cable) and/or wireless scenarios (e.g., a wireless local area network (WLAN) such as WiFi, a personal area network (PAN) such as Bluetooth, or a cellular or radio network), and which encodes a set of computer-readable instructions that, when executed by a processor of a device, cause the device to implement the techniques presented herein.

Figure 6:
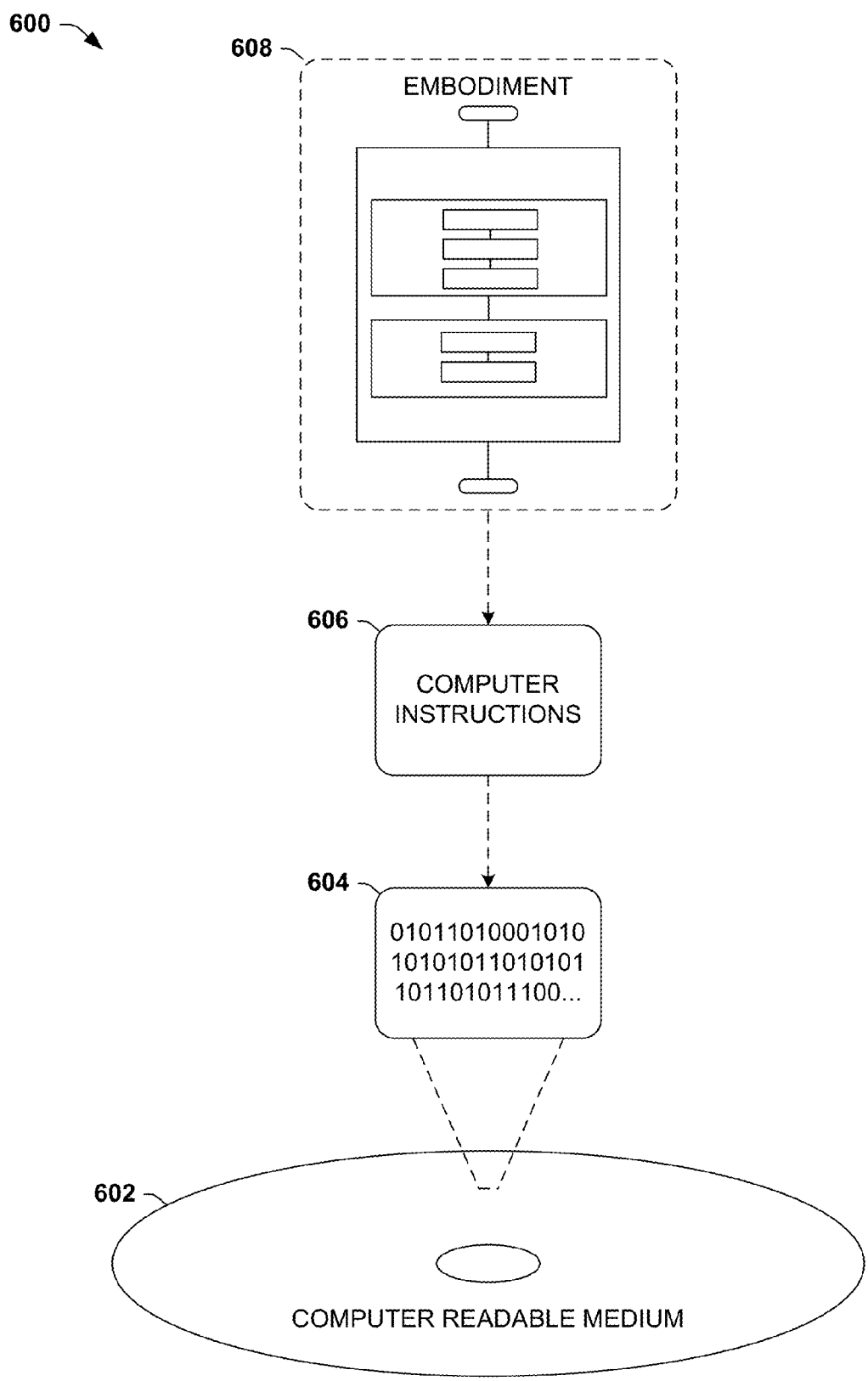
FIG. 6 is an illustration of an exemplary computer-readable medium comprising processor-executable instructions configured to embody one or more of the provisions set forth herein.

An exemplary computer-readable medium that may be devised in these ways is illustrated in FIG. 6, wherein the implementation 600 comprises a computer-readable medium 602 (e.g., a CD-R, DVD-R, or a platter of a hard disk drive), on which is encoded computer-readable data 604. This computer-readable data 604 in turn comprises a set of computer instructions 606 configured to operate according to the principles set forth herein. In one such embodiment, the processor-executable instructions 606 may be configured to perform a method 608 of classifying the movement of objects 312 according to a lidar point cloud 210, such as the exemplary method 400 of FIG. 4. In another such embodiment, the processor-executable instructions 606 may be configured to implement a system for classifying the movement of objects 312 according to a lidar point cloud 210, such as the exemplary system 506 of FIG. 5. Some embodiments of this computer-readable medium may comprise a computer-readable storage medium (e.g., a hard disk drive, an optical disc, or a flash memory device) that is configured to store processor-executable instructions configured in this manner. Many such computer-readable media may be devised by those of ordinary skill in the art that are configured to operate in accordance with the techniques presented herein.

D. Variations

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., the exemplary method 400 of FIG. 4 and the exemplary system 506 of FIG. 5) to confer individual and/or synergistic advantages upon such embodiments.

D1. Scenarios

A first aspect that may vary among embodiments of these techniques relates to the scenarios wherein such techniques may be utilized.

As a first variation of this first aspect, the techniques presented herein may be utilized to evaluate many types of objects, including vehicles 102 traveling in an environment 100, such as automobiles and bicycles traveling on a roadway or airplanes traveling in an airspace; individuals moving in an area, such as a motion-capture environment 100; and projectiles moving in a space, such as ballistics.

As a second variation of this first aspect, the techniques presented herein may be utilized with many types of lidar signals 204, including visible, near-infrared, or infrared, near-ultraviolet, or ultraviolet light. Various wavelengths of lidar signals 204 may present various properties that may be advantageous in different scenarios, such as passage through various media (e.g., water or air of varying humidity), sensitivity to various forms of interference, and achievable resolution.

As a third variation of this first aspect, the techniques presented herein may be utilized with various types of lidar emitters 202 and/or lidar detectors 208, such as various types of lasers and photometric detectors. Additionally, such equipment may be utilized in the performance of other techniques (e.g., lidar equipment provided for range detection in vehicle navigation systems may also be suitable for the classification of moving and stationary objects), and may be applied to both sets of techniques concurrently or in sequence.

As a fourth variation of this first aspect, the classification 316 of the objects 312 according to the techniques presented herein may be usable in many ways. As a first example, the classification 316 of objects 312 as moving or stationary may be usable to identify the regions of corresponding images where the objects 312 are present. Object-based image evaluation techniques may therefore be focused on the specific areas of the images, e.g., in order to perform an automated evaluation and/or identification of the objects 312; in order to identify the portions of the images to be redacted (e.g., in furtherance of the privacy of individuals associated with the objects 312 in images to be made available to the public); and/or in order to compensate for the presence of the objects 312 in the images (e.g., removing objects classified as moving objects in order to avoid obscured areas of the images while reconstructing a three-dimensional model of the environment 100). As a second example, the classification 316 of objects 312 may facilitate object recognition, e.g., classifying the respective objects 312 as an object type according to the movement of the object 312. For example, the device may comprise an object type classifier that is trained to select object type classifications of objects 312, and the device may invoke the object type classifier to classify an object 312 into an object type in view of the classification 316 of the movement of the object 312. Those of ordinary skill in the art may devise a broad variety of such scenarios and/or uses for the classification 316 of objects 312 according to the techniques presented herein.

D2. Voxel Mapping and Clustering

A second aspect that may vary among embodiments of the techniques presented herein relates to the mapping 302 of lidar points 214 of a lidar point cloud 210 to the voxels 306 of a three-dimensional voxel space 304.

As a first variation of this first aspect, the mapping 302 may involve a three-dimensional voxel space 304 of various sizes. For example, the voxels 306 may be uniformly spaced across the three-dimensional voxel space 304, or may vary in size and/or density. In an embodiment, in order to compensate for potential dispersal of the laser over distance, the voxels 306 further from the lidar detector 208 in the three-dimensional voxel space 304 may have a larger size than voxels 306 that are closer to the lidar detector 208.

As a second variation of this second aspect, the mapping 302 may involve a comparison of an adjacency threshold between a selected voxel 306 and other voxels 306 of the three-dimensional voxel space 304. For example, it may be determined that if a first voxel 306 that is mapped to at least one lidar point 214 is within an adjacency threshold of three voxels of a second voxel 306 that is mapped to at least one lidar point 214, then the voxels 306 are determined to share an adjacency, and therefore are part of the same voxel cluster. As a further variation, the axes within the three-dimensional voxel space 304 may have different adjacency thresholds; e.g., a first axis within the three-dimensional voxel space 304 may have a first adjacency threshold, while a second axis within the three-dimensional voxel space 304 may have a second adjacency threshold that is different from the first adjacency threshold. In one such variation, the axis parallel to the view of the lidar detector 208 within the three-dimensional voxel space 304 may be selected as having a significantly larger adjacency threshold, since voxels 306 that are connected along this axis may be difficult to detect with a surface-based lidar reflection 206 (e.g., a first voxel 306 that is close to the lidar detector 208 may be connected to a second voxel 306 that is distant from the lidar detector 208 through a connecting piece of the object 312 oriented parallel to the axis of view, and thus not detected by reflective lidar).

As a third variation of this second aspect, the mapping 302 may determine that two or more voxel clusters are connected. For example, nearby voxel clusters may be connected by a portion of the object 312 that is not highly reflective, thus resulting in few lidar points 214. The lidar detector 208 may conclude that if the voxel clusters are nearby and appear to move together, then the voxel clusters are likely connected and thus represent the same object 312. Determining connectedness may be achieved, e.g., by selecting a first voxel cluster, performing a nearest neighbor search (e.g., a breadth-first search) of the three-dimensional voxel space 304, and finding a second voxel cluster that appears to be connected to the first voxel cluster. These and other variations may facilitate the mapping of lidar points 214 to voxels 306 in the three-dimensional voxel space 304 in accordance with the techniques presented herein.

D3. Classifying Lidar Point Movement

A third aspect that may vary among embodiments of the techniques presented herein relates to the classification of the movement of the lidar points 214.

As a first variation of this third aspect, the classification may be performed by classifying the movement of the respective voxels 306 within the three-dimensional voxel space 304. For example, for respective voxels 306, a measurement may be performed of an occupancy duration of the voxel over time by at least one lidar point 214 of the lidar point cloud 210. If the occupancy duration of the voxel 306 is determined to be within an occupancy time variance threshold (e.g., if the voxel 306 is occupied by at least one lidar point 214 for more than a threshold duration), then the voxel 306 may be classified as stationary, as well as the lidar points 214 mapped to the voxel 306. Conversely, lidar points 214 that are not mapped to a voxel 306 that is classified as stationary may be classified as moving. As one such variation, the occupancy duration may be measured and compared as a standard deviation of the occupancy duration of respective voxels 306 of the three-dimensional space 304, and voxels 306 presenting an occupied status for more than one standard deviation may be classified as stationary. This variation may be advantageous, e.g., for reducing the effects of small variations in the positions of the lidar points 214 over time, such as rotation, shape changes, or detector jitter, that do not translate to motion.

As a second variation of this third aspect, rather than performing the classification of movement of lidar points 214 and/or objects 312 according to predefined calculations, the classification may be performed by a movement classifier that has been trained to select a classification 316 of movement of the lidar points 214 and/or objects 312, such as an artificial neural network or genetic algorithm. Many such variations may be devised for classifying the movement of lidar points 214 and/or objects 312 in accordance with the techniques presented herein.

D4. Further Processing

A fourth aspect that may vary among embodiments of the techniques presented herein relates to additional processing that may be applied during the classification 316 of the movement of the objects 312.

As a first variation of this fourth aspect, after classifying the movement of respective objects 312, the device may map the lidar points 214 of the lidar point cloud 210 to the respective objects 312. That is, after achieving the classification 316 of the objects 312 based on the aggregated, collective classification of the lidar points 214, the individual lidar points 214 may then be remapped to the objects 312 in order to verify that substantially all of the lidar points 214 of the lidar point cloud 210 have been accounted in the classification. A small number of lidar points 214 that are not mapped to any of the objects 312 may be dismissed as artifacts, but a significant number of lidar points 214 that are not mapped to any of the objects 312 may provoke a recomputation, perhaps with adjusted parameters (e.g., different voxel sizes).

As a second variation of this fourth aspect, the device may, for respective objects 312, estimate a position and an orientation of the object 312 according to the lidar points 214 of the lidar point cloud 210 that are associated with the object 312. Alternatively or additionally, the device may, for respective objects 312, estimate at least one vector of the object 312 over a time axis of the lidar point cloud (e.g., estimating the speed or acceleration of the object 312 over a period of time). These types of may provide data that may inform, e.g., a prediction of imminent changes in the movement of the object 312, and/or may facilitate the consolidation of lidar points 214 of the lidar point cloud 210 to respective objects 312. Additionally, in some variations, the device may subtract the vector of the object 312 from at least one lidar point 214 that is associated with the object 312, thereby providing information as to the relative movement of the lidar points 214 with respect to the object 312 (e.g., a change of orientation and/or shape of the object 312 during movement).

As a third variation of this fourth aspect, the lidar point cloud 210 may be detected by a lidar detector 208 that is mounted on a vehicle 102 having a vehicle vector (e.g., a direction, speed, and/or orientation). The vehicle vector of the vehicle 102 may be subtracted from the vectors of the objects 312 detected in the environment 100, e.g., in order to discount the movement of the lidar detector 208 from the estimation of movement of the object 312, thereby translating a mapping of movement relative to the lidar detector 208 to a mapping of movement relative to the environment 100.

Figure 7:
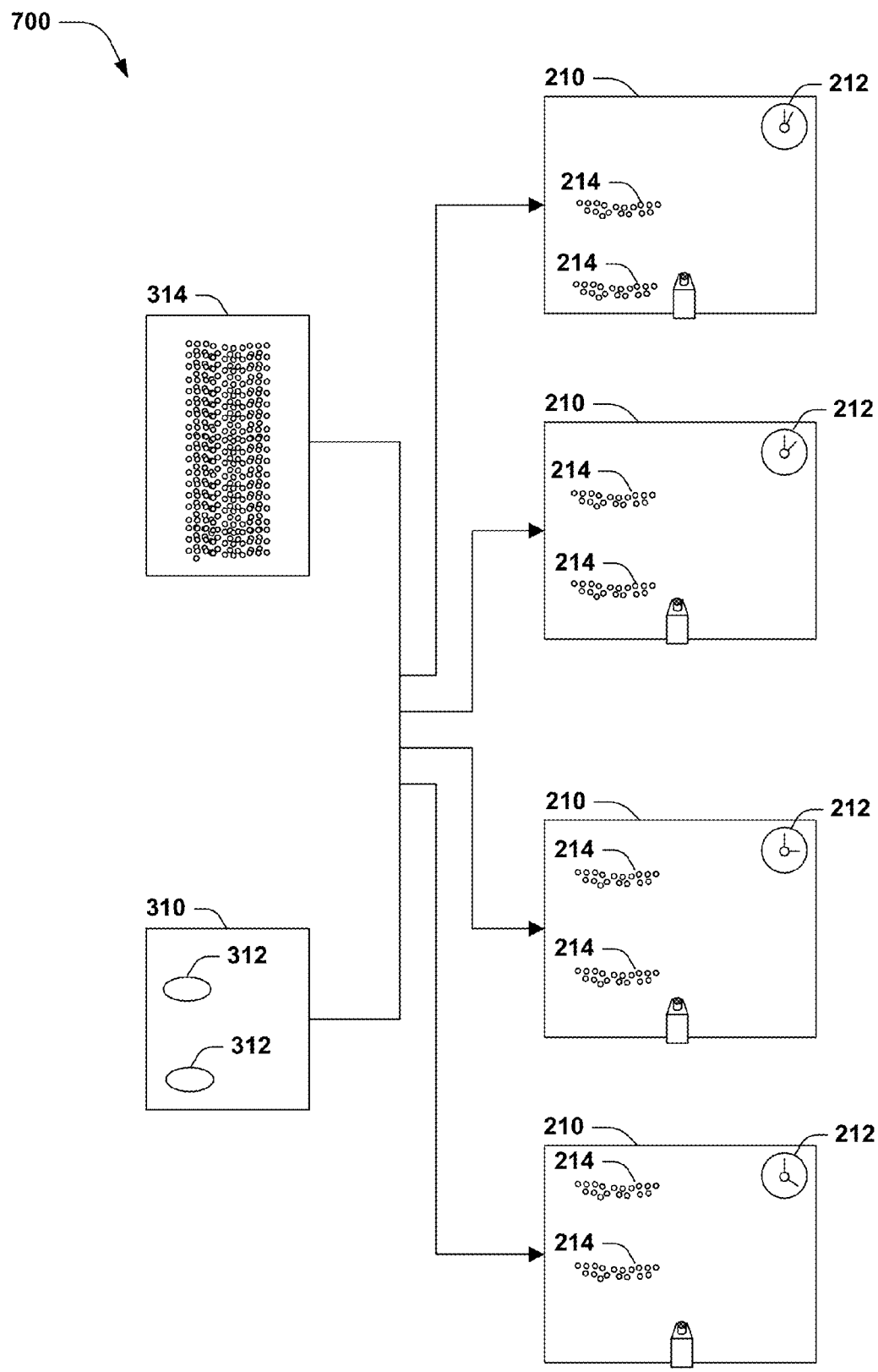
FIG. 7 is an illustration of an exemplary scenario featuring a repartitioning of a lidar point cloud following a classification of objects in order to distinguish nearby objects in accordance with the techniques presented herein.

FIG. 7 presents an illustration of an exemplary scenario 700 featuring some such variations of this fourth aspect. In this exemplary scenario 700, after the lidar point cloud 210 is detected, respective lidar points 214 are associated with an object 312 in the environment 100 at various time points 212. This association may distinguish objects 312 that may otherwise be obscured in the projection 314 of the lidar point cloud 210; e.g., two vehicles that are moving in the same direction but closely following each other may result in a conflated projection 314 when aggregated over time, but may be distinguished by associating the lidar points 216 with the identified objects 312 at different time points 212. Those of ordinary skill in the art may devise many such techniques for further processing the lidar points 214 of the lidar point cloud 210 in accordance with the techniques presented herein.

E. Computing Environment

Figure 8:
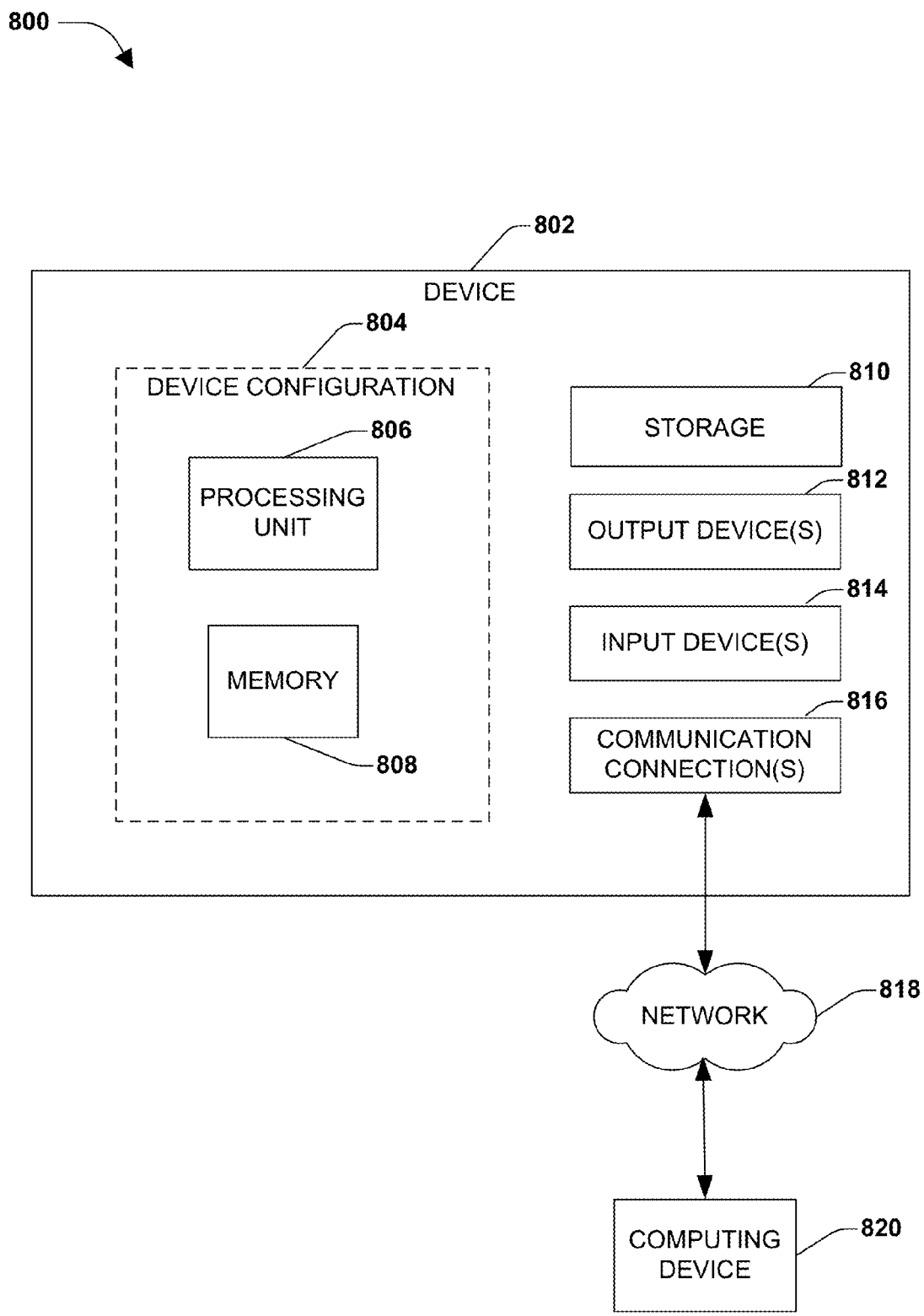
FIG. 8 illustrates an exemplary computing environment wherein one or more of the provisions set forth herein may be implemented.

FIG. 8 and the following discussion provide a brief, general description of a suitable computing environment to implement embodiments of one or more of the provisions set forth herein. The operating environment of FIG. 8 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 8 illustrates an example of a system 800 comprising a computing device 802 configured to implement one or more embodiments provided herein. In one configuration, computing device 802 includes at least one processing unit 806 and memory 808. Depending on the exact configuration and type of computing device, memory 808 may be volatile (such as RAM, for example), non-volatile (such as ROM, flash memory, etc., for example) or some combination of the two. This configuration is illustrated in FIG. 8 by dashed line 804.

In other embodiments, device 802 may include additional features and/or functionality. For example, device 802 may also include additional storage (e.g., removable and/or non-removable) including, but not limited to, magnetic storage, optical storage, and the like. Such additional storage is illustrated in FIG. 8 by storage 810. In one embodiment, computer readable instructions to implement one or more embodiments provided herein may be in storage 810. Storage 810 may also store other computer readable instructions to implement an operating system, an application program, and the like. Computer readable instructions may be loaded in memory 808 for execution by processing unit 806, for example.

The term "computer readable media" as used herein includes computer storage media. Computer storage media includes volatile and nonvolatile, removable and non-removable media implemented in any method or technology for storage of information such as computer readable instructions or other data. Memory 808 and storage 810 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 802. Any such computer storage media may be part of device 802.

Device 802 may also include communication connection(s) 816 that allows device 802 to communicate with other devices. Communication connection(s) 816 may include, but is not limited to, a modem, a Network Interface Card (NIC), an integrated network interface, a radio frequency transmitter/receiver, an infrared port, a USB connection, or other interfaces for connecting computing device 802 to other computing devices. Communication connection(s) 816 may include a wired connection or a wireless connection. Communication connection(s) 816 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 802 may include input device(s) 814 such as keyboard, mouse, pen, voice input device, touch input device, infrared cameras, video input devices, and/or any other input device. Output device(s) 812 such as one or more displays, speakers, printers, and/or any other output device may also be included in device 802. Input device(s) 814 and output device(s) 812 may be connected to device 802 via a wired connection, wireless connection, or any combination thereof. In one embodiment, an input device or an output device from another computing device may be used as input device(s) 814 or output device(s) 812 for computing device 802.

Components of computing device 802 may be connected by various interconnects, such as a bus. Such interconnects may include a Peripheral Component Interconnect (PCI), such as PCI Express, a Universal Serial Bus (USB), Firewire (IEEE 1394), an optical bus structure, and the like. In another embodiment, components of computing device 802 may be interconnected by a network. For example, memory 808 may be comprised of multiple physical memory units located in different physical locations interconnected by a network.

Those skilled in the art will realize that storage devices utilized to store computer readable instructions may be distributed across a network. For example, a computing device 820 accessible via network 818 may store computer readable instructions to implement one or more embodiments provided herein. Computing device 802 may access computing device 820 and download a part or all of the computer readable instructions for execution. Alternatively, computing device 802 may download pieces of the computer readable instructions, as needed, or some instructions may be executed at computing device 802 and some at computing device 820.

F. Usage of Terms

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method of detecting movement of objects depicted in a lidar point cloud on a device comprising a processor, the method comprising:
   executing on the processor instructions configured to:
      identify at least one object represented by a voxel cluster of voxels respectively corresponding to lidar points in the lidar point cloud and sharing an adjacency within a three-dimensional voxel space;
      for the respective lidar points in the lidar point cloud:
         associate the lidar point with a selected object, and
         compare a first position of the lidar point at a first time and a second position of the lidar point at a second time to classify the movement of the lidar point according to the selected object; and
      for the respective objects, classify the movement of the object according to the movement of the respective lidar points associated with the object.

2. The method of claim 1, identifying respective objects further comprising: identifying the object represented by a voxel cluster of voxels sharing an adjacency within an adjacency threshold within the three-dimensional voxel space.

3. The method of claim 2:
   a first axis within the three-dimensional voxel space has a first adjacency threshold;
   a second axis within the three-dimensional voxel space has a second adjacency threshold that is different from the first adjacency threshold; and
   identifying the object further comprising: identifying the object represented by a cluster of voxels respectively sharing, for respective axes within the three-dimensional space, an adjacency within the adjacency threshold of the axis.

4. The method of claim 1, identifying the at least one object further comprising:
   identifying at least two voxel clusters of voxels within the three-dimensional voxel space;
   determining that the at least two voxel clusters are connected.

5. The method of claim 4, determining that the at least two voxel clusters are connected further comprising:
   selecting a first voxel cluster; and
   performing a nearest neighbor search of at least one other voxel cluster to identify a connection with the first voxel cluster.

6. The method of claim 1, classifying the movement of respective lidar points further comprising:
   classifying a movement of the respective voxels within the three-dimensional space; and
   classifying the movement of the lidar point according to a classification of the movement of the voxel mapped to the lidar point.

7. The method of claim 6, classifying the movement of the respective voxels further comprising:
   for respective voxels, measuring an occupancy duration of the voxel over time by at least one lidar point of the lidar point cloud; and
   comparing the occupancy duration of the voxel with an occupancy time variance threshold.

8. The method of claim 7:
   measuring the occupancy duration of the voxel further comprising: measuring a standard deviation of the occupancy duration of the voxel; and
   comparing the occupancy duration of the voxel further comprising: comparing the standard deviation of the occupancy duration of the voxel with a standard deviation threshold.

9. The method of claim 6:
   the device further comprising a movement classifier trained to select a classification of the movement of the object; and
   classifying the movement of the respective objects further comprising: invoking the movement classifier to select the classification of the movement of the object.

10. The method of claim 1, the instructions further configured to, after classifying the movement of the respective objects, map the lidar points of the lidar point cloud to the respective objects.

11. The method of claim 10:
    the lidar point cloud having a time axis; and
    the instructions further configured to track the movement of the respective objects over the time axis of the lidar point cloud.

12. The method of claim 1, the instructions further configured to, for respective objects, estimate a position and an orientation of the object according to the lidar points of the lidar point cloud that are associated with the object.

13. The method of claim 1:
    the lidar point cloud having a time axis; and
    the instructions further configured to, for respective objects, estimate at least one vector of the object over the time axis of the lidar point cloud.

14. The method of claim 13, the instructions further configured to, for respective lidar points associated with the object, subtract the at least one vector of the object from the lidar point.

15. The method of claim 13:
    the lidar point cloud detected by a vehicle having at least one vehicle vector; and
    estimating the at least one vector of the object further comprising: subtracting the at least one vehicle vector of the vehicle from the at least one vector of the object.

16. The method of claim 1, the instructions further configured to classify the object as an object type according to the movement of the object.

17. The method of claim 16:
    the device further comprising an object type classifier trained to select an object type classification of the object; and
    classifying the object type of the object further comprising: invoking the object type classifier to select the object type classification of the object.

18. The method of claim 1:
    the lidar point cloud associated with at least one image; and
    the instructions further configured to, for respective objects classified as a moving object, remove the moving object from the at least one image.

19. A system for detecting movement of objects depicted in a lidar point cloud on a device comprising a processor, the system comprising:
    an object identifier configured to:
       identify at least one object represented by a voxel cluster of voxels respectively corresponding to lidar points in the lidar point cloud and sharing an adjacency within a three-dimensional voxel space; and an object movement classifier configured to:
for the respective lidar points in the lidar point cloud:
associate the lidar point with a selected object, and
compare a first position of the lidar point at a first time and a second position of the lidar point at a second time to classify the movement of the lidar point according to the selected object; and
for the respective objects, classify the movement of the object according to the movement of the respective lidar points associated with the object.

20. A computer-readable storage medium comprising instructions that, when executed on a processor of a device, cause the device to detect movement of objects depicted in a lidar point cloud by:
identifying at least one object represented by a voxel cluster of voxels respectively corresponding to lidar points in the lidar point cloud and sharing an adjacency within a three-dimensional voxel space;
for the respective lidar points in the lidar point cloud:
associating the lidar point with a selected object, and
comparing a first position of the lidar point at a first time and a second position of the lidar point at a second time to classify the movement of the lidar point according to the selected object; and
for the respective objects, classifying the movement of the object according to the movement of the respective lidar points associated with the object.

* * * * *